July 25, 1933.  L. HOLM  1,919,432

HOUSING OF ELECTRICAL SWITCHES OR DISTRIBUTION BOXES

Filed June 13, 1930

Inventor
Ludwig Holm
by Steward & McKay
his attorneys

Patented July 25, 1933

1,919,432

UNITED STATES PATENT OFFICE

LUDWIG HOLM, OF STUTTGART, GERMANY, ASSIGNOR TO ROBERT BOSCH AKTIEN-GESELLSCHAFT, OF STUTTGART, GERMANY

HOUSING OF ELECTRICAL SWITCHES OR DISTRIBUTION BOXES

Application filed June 13, 1930, Serial No. 460,964, and in Germany June 17, 1929.

The present invention relates to housings for the accommodation for example, of electrical switches or distribution boxes.

Cylindrical members and covers for the same which form, for example housings for press button switches, distributing boxes and the like are often connected together by threads or by means of pins or even by a collar on the inner member corresponding to a groove in the outer member.

The cutting of threads is expensive and can only be reliably used when the metal is of a sufficient strength. The construction with pins and groove is not secure against accidental pressures and shocks as are experienced in motor vehicles.

According to the present invention the above mentioned disadvantages are avoided by using a spring with two curved projections which rest in two slots of the inner member and engage into two or more corresponding slots in the outer member. The advantage of this lies in the cheapness of manufacture and in the fact that the parts can be easily assembled and that accidental pressure or shock cannot prevent them from coming loose.

Two forms of construction of the invention are shown by way of example in the accompanying drawing in which:—

Figure 1:
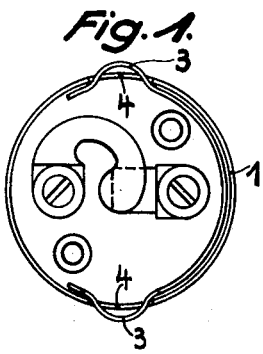
Figure 1 is a plan of a casing for a press button switch.
Figure 2:
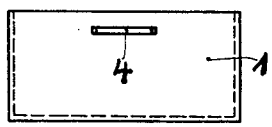
Figure 2 is a side elevation of the casing.
Figure 3:
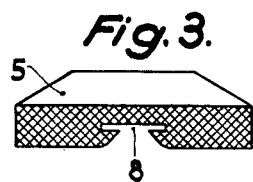
Figure 3 is a side elevation of a cover for said casing.

The press button switch housing according to Figures 1-3 consists of a pot shaped casing 1 having two diametral slots 4 in which engage the curved prominences 3 of a spring. The cover 5 has two T-shaped or open sided slots 8 the openings of which are enlarged of cone shape towards the edge of the cover. When the cover is being fixed in position the inclined edges of the openings press on the curved prominences of the spring 3, which move inwards until the slots 8 reach positions aligned with the slots 4 in the casing whereon the curved prominences 3 spring into the slots in the cover. The cover can now only be removed by rotation against the casing, whereby the prominences of the spring are pressed under the edge of the cover as a result of the curved construction of said prominences. From the foregoing it will be seen that the inclined edges of the openings leading to the slots formed in the cover 5 simultaneously serve as guides for the cover and as cam elements for pressing in the outwardly curved portions of the spring when the cover is forced upon the housing in an axial direction.

Figure 4:
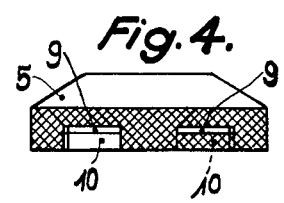
Figure 4 is a side elevation of a modified form of cover.

The second form of construction of the cover according to Figure 4 has two slots 9 and two recesses 10 both lying diametrically opposite each other. The cover is so affixed that the prominences first enter the edge recesses 10 and are then allowed to spring into the slots by turning the cover against the casing.

What I claim is:

1. A housing comprising a casing having at least two slots in the side thereof, a cover for said casing having at least two corresponding slots in the wall thereof and having openings in said wall extending from the slots to the edge of the wall and widening towards the edge and a part circular spring within said casing having outwardly curved portions extending through the slots in the casing and adapted to engage the slots in the cover to hold the cover in position on the casing, the inclined edges of said openings being spaced apart sufficiently to embrace said curved portions and being adapted to serve as guides for said cover and as cam elements for pressing inwardly said curved portions as said cover is forced axially onto said casing.

2. A housing comprising a casing and a cover for the casing, said casing and cover each having at least two corresponding slots in the sides thereof and an arcuate spring within the casing having outwardly curved portions protruding through the slots in the casing and adapted to engage in the slots in the cover, the cover having openings extending from the slots to the edge thereof said openings being narrower at their inner ends than the length of the slots but widening outwardly towards the edge of the cover to a width greater than the length of the curved portions of said spring, whereby the inclined edges of said openings are adapted to embrace said curved portions and simultaneously serve as guides for said cover and as cam elements for forcing inwardly said curved portions when said cover is forced axially upon said casing.

3. A housing comprising a casing having at least two closed slots in the side thereof, a cover having at least two open sided slots and at least two closed slots in the side thereof and an arcuate spring within the casing having outwardly curved portions extending through the slots in the casing and adapted to be moved axially of the cover into the open sided slots in the cover and then circumferentially into the closed slots in the cover.

LUDWIG HOLM.